(12) United States Patent  
Prosso et al.

(10) Patent No.: US 8,321,857 B1
(45) Date of Patent: Nov. 27, 2012

(54) AUTOMATED GENERATION OF APPLICATION DATA FOR APPLICATION DISTRIBUTION

(75) Inventors: Arthur Prosso, Tallinn (EE); Andrew Bosch, Lindon, UT (US)

(73) Assignee: Symantec Corporation, Cupertino, CA (US)

( * ) Notice: Subject to any disclaimer, the term of this patent is extended or adjusted under 35 U.S.C. 154(b) by 721 days.

(21) Appl. No.: 12/559,319

(22) Filed: Sep. 14, 2009

(51) Int. Cl.
 G06F 9/44 (2006.01)
 G06F 9/445 (2006.01)
(52) U.S. Cl. ........................................ 717/172; 717/177
(58) Field of Classification Search .................. 717/168, 717/169, 172, 174, 175, 177
See application file for complete search history.

(56) References Cited

U.S. PATENT DOCUMENTS

| 6,877,134 | B1* | 4/2005 | Fuller et al. ............... 715/202 |
| 8,171,141 | B1* | 5/2012 | Offer et al. ................ 709/226 |
| 2005/0091655 | A1* | 4/2005 | Probert et al. ............. 718/100 |
| 2007/0088707 | A1* | 4/2007 | Durgin et al. .............. 707/10 |

* cited by examiner

*Primary Examiner* — Anna Deng
(74) *Attorney, Agent, or Firm* — Fenwick & West LLP

(57) ABSTRACT

An application registration module executes on a client, extracting metadata from a local application designed for an operating system of the client, formulating installation instructions, and providing the application, metadata, and installation instructions to a distribution server. The distribution server can then be used to facilitate installation of the application on other clients having the same operating system as the source client.

15 Claims, 4 Drawing Sheets

Application registration module 112

Metadata extraction module 320

Installation instructions module 330

Format standardization module 340

Upload module 350

FIG. 3

AUTOMATED GENERATION OF APPLICATION DATA FOR APPLICATION DISTRIBUTION

BACKGROUND OF THE INVENTION

1. Field of the Invention

This invention pertains in general to computer system administration, and more specifically, to facilitation of installation of an application to other clients in an enterprise using a distribution server.

2. Description of Related Art

Software distribution servers facilitate installation of applications on multiple client systems. Using current software distribution servers, an administrator of an enterprise analyzes an application of a source client system, uploading the application along with any additional required information to the software distribution server. This application data is then stored on the server and used for subsequent installation of the application on a set of target clients within the enterprise.

However, these current software distribution servers require an administrator or other human user expressly to analyze the application in order to provide the application to the software distribution server in the format required by the server. This places on the administrator the burden of viewing, analyzing, and manipulating the application data. This burden increases in proportion to the number of distinct application formats that are supported, since the administrator must then be familiar with many different formats in order to properly analyze and manipulate the application data. The burden is further increased when the operating system of the client on which the application is located is not one with which the administrator is familiar, since the administrator is then even less likely to be familiar with the different application formats supported by that operating system, or to have the necessary expertise with the various system tools used to perform the analysis and manipulation of the application.

As one example, the server operating system could be some version of MICROSOFT WINDOWS, but the enterprise could have a number of APPLE MAC OS X client systems, which support application package formats such as .app, .pkg, .mpkg, and .dmg. An administrator familiar with WINDOWS but not with MACINTOSH systems would thus be unlikely to be familiar with the different possible tools and commands used to analyze and manipulate the applications, much less the details of the various package formats.

SUMMARY

Embodiments of a computer-readable storage medium store a computer program executable by a processor for registering an application for distribution to a plurality of clients. The computer program comprises a metadata extraction module for extracting metadata from an application package of a local application designed for a first operating system, and an installation instructions module for determining instructions for installing the application on a different client having the first operating system. The computer program further comprises an upload module for providing the application package, the extracted metadata, and the determined instructions to a distribution server for storage on the distribution server.

A client computer system for registering an application for distribution to a plurality of other client computer systems comprises a first operating system and a computer processor. The computer processor executes instructions performing actions comprising extracting metadata from an application package of a local application designed for the first operating system. The performed actions further comprise determining instructions for installing the application on a second client having the same operating system as the first operating system, and providing the application package, the extracted metadata, and the determined instructions to a distribution server for storage on the distribution server.

One embodiment of a computer-implemented method extracts metadata from an application package of a local application designed for the first operating system. The method additionally determines instructions for installing the application on a second client having the same operating system as the first operating system, and provides the application package, the extracted metadata, and the determined instructions to a distribution server for storage on the distribution server.

BRIEF DESCRIPTION OF DRAWINGS

FIG. 3 is a high-level block diagram illustrating a detailed view of the application registration module 112 of FIG. 1, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
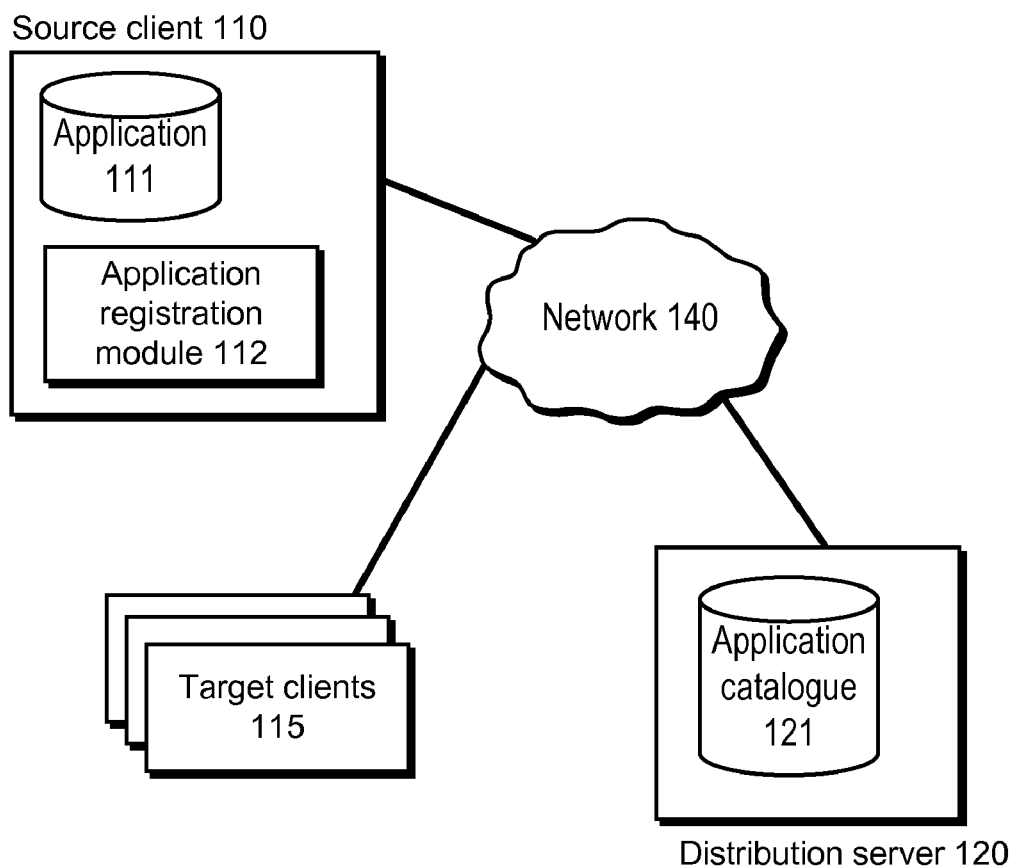
FIG. 1 is a high-level block diagram of a computing environment 100 according to one embodiment.

FIG. 1 is a high-level block diagram of a computing enterprise 100 according to one embodiment. FIG. 1 illustrates a source client 110, target clients 115, and a distribution server 120 connected by a network 140. Only one source client 110, several target clients 115, and one distribution server 120 are depicted in FIG. 1 in order to simplify and clarify the description. Embodiments of the computing enterprise 100 can have thousands or millions of source clients 110, target clients 115, or distribution servers 120 connected to the network 140.

In general, the source client 120 has an application that administrators or other users of the enterprise 100 may wish to install on target clients 115 which have the same operating system as the source client. The application is provided to the distribution server 120, which stores the application for subsequent installation on the target clients 115. The distribution server 120 may have a different operating system than the source client 110 and target clients 115. As one example referenced throughout the remainder of the discussion, the clients 110, 115 run a version of the MAC OS X operating system, and the distribution server 120 runs a version of the MICROSOFT WINDOWS operating system. It is appreciated that these particular operating systems need not be employed. Rather, the clients 110, 115 and the server 120 may respectively run any operating systems that are different from each other, such as WINDOWS and UNIX, or may run the same operating system.

More specifically, the source client 110 is a computer system on which an application 111 resides, e.g., as one or more files by which the application may be, or has already been, installed. The term "application package" is used herein to denote the storage unit or units that contain the various application files. For example, in the case of MAC OS X, the operating system supports several different package types, including a MAC native package (.pkg) which is structured as a directory containing files and is installed by the standard MAC installation utility "installer," a metapackage (.mpkg) structured as a directory containing other packages or metapackages and which is likewise installed by the "installer" utility, an application bundle (.app) stored as a directory with extension .app and installed by copying it into the Applications folder at the root level of the primary hard drive partition, and a disk image (.dmg) which represents one or more packages as a single ISO file and is installed by mounting the file to the filesystem and running the installation method appropriate to the formats of the package(s) within. The source client 110 further comprises an application registration module 112, which performs all the operations necessary to provide the application 111 and any associated metadata to the distribution server 120 for storage. The application registration module 112 is discussed below in greater detail with respect to FIG. 3.

The target clients 115 have the same operating system as the source client 110 and thus may install the application 111 locally. An operating system is considered herein to be "the same" as another operating system if it is the same version of the same operating system, or a different version of the same operating system that is nonetheless sufficiently similar to allow installation of the application 111. For example, MAC OS X supports installation of applications having the .mpkg package format in version 10.2 and later. Thus, OS X versions 10.2, 10.2.1, 10.3 and the like would be considered the same for purposes of installing an application packaged in .mpkg format, but version 10.1 would not be considered the same as version 10.2, nor would a different type of operating system, such as UNIX, LINUX, or MICROSOFT WINDOWS, that does not natively provide the same tools and support the same package formats.

The distribution server 120 stores the application 111 from the source client 110, along with any associated metadata and instructions for client installation. The application 111 may then be installed on the target clients 115, initiated either by the distribution server (e.g., by automatic "push" to the target clients in response to a triggering rule, such as the arrival of a specific date and time) or by a target client 115 (e.g., by an administrator manually running commands causing installation from the distribution server 120). Metadata stored by the distribution server 120 may include, for example, data such as application name, application version, and application vendor. The data for an application 111 can be stored as an entry in an application catalogue 121, along with its associated metadata and installation instructions. For example, using a program provided by the distribution server 120, a user could browse a list of all the applications stored on the distribution server 120 and available for installation on the target clients 115, including their names, versions, vendors, and the like.

The network 140 represents the communication pathways between the clients 110, 115 and the distribution server 120. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
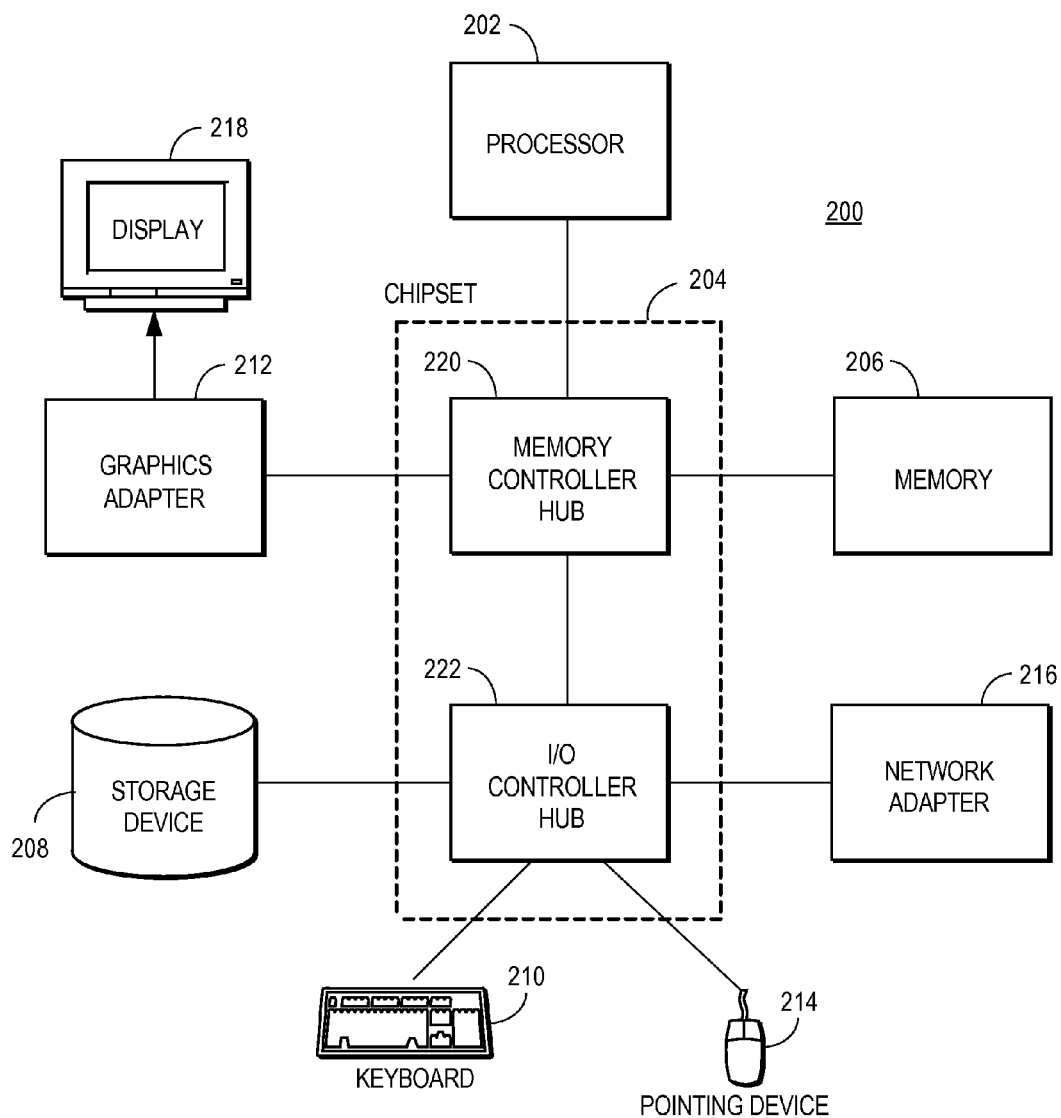
FIG. 2 is a high-level block diagram illustrating physical components of a computer, such as a client or distribution server, according to one embodiment.

FIG. 2 is a high-level block diagram illustrating physical components of a computer, such as a client 110, 115 or distribution server 120 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

FIG. 3 is a high-level block diagram illustrating a detailed view of the application registration module 112 of FIG. 1, according to one embodiment. The application registration module 112 takes as input the application 111, which, as discussed above, can be embodied in a number of different formats. For example, on a client 110 running MAC OS X, the application 111 could be stored as a file or directory of type .app, .pkg, .mpkg, .dmg, and the like. In one embodiment, the application registration module 112 comprises a number of modules for carrying out various tasks, such as a metadata extraction module 320, an installation instructions module 330, a format standardization module 340, and an upload module 350.

The metadata extraction module 320 extracts metadata from the application 111. The extracted metadata is typically used by the distribution server 120 to populate its catalogue 121 of available applications. Possible extracted metadata can include the name of the application (e.g., "MySpreadsheet"), the version of the application (e.g. "2.0.1"), the vendor/author of the application (e.g., "Business Software, Inc."), the operating system for which the application is designed (e.g., "Mac OS X v.10.2.x"), the date of release of the application, an icon or other graphical representation of the application, a description of the application, the language or locale of an application, a target software release or service pack and list of application files and pre and post-install scripts, and the category of the application (e.g., "Office/Spreadsheet"). The particular manner of extracting the metadata can vary with both the operating system and with the particular format in which the application is packaged. For example, an application packaged in .pkg format on MAC OS X would have the name of the application stored within an Info.plist file stored within a Contents subfolder of the application package, and the version of the application within the package version file of the Contents/Resources subfolder, both files requiring further parsing to extract the data of interest. As another example, a MAC OS X application packaged as a .dmg file that further stores a .pkg file would first be mounted to a location on the filesystem using the mount command of OS X, then the enclosed .pkg file read and processed as in the prior example, and then the application's .dmg file would be unmounted using the unmount command. Thus, in one embodiment the metadata extraction module 320 includes functionality for determining whether an application package includes one or more subpackages, and if so, mounting the application package to a mount point on the filesystem, extracting the subpackage(s) contained within the application package, extracting metadata from the subpackage(s), and unmounting the application package after the subpackage(s) has been extracted. The metadata extraction module 320 further includes functionality to identify predetermined files (e.g., a well-known file such as Info.plist) within the application package and to parse the given files to identify metadata of interest (e.g., application name).

In one embodiment, the metadata extraction module 320 extracts the relevant metadata information by executing a utility provided by the operating system in question, such as the installer tool, and obtaining the metadata from the variables that the utility outputs. In such an embodiment, the metadata extraction module 320 has knowledge of the various utilities (e.g., their names, arguments, and return values) available on the operating system.

The installation instructions module 330 determines instructions to use for installing the application 111 on the target clients 115. In one embodiment, the installation instructions module 330 formulates a command line to be run on the target clients 115, the command line causing execution of an installation program or script that performs the tasks necessary to install the application 111 from the distribution server 120. For example, if the target clients 115 have a script named install_application that installs an application X when run with the argument—install X, the assembled command line could be "install_application—install browserapp.dmg" for an application the extracted name of which is browserapp and which is stored in the .dmg package format. The install_application script could perform operations such as calling the mount command, followed by a call to the operating system's installer utility on the package encapsulated within browserapp.dmg, followed by a call to the unmount command. In another embodiment, the installation instructions module 330 creates an installation file containing the instructions needed to carry out the installation, such as the commands that would be run by the script install_application. A target client would then obtain and execute the installation file in order to install the application.

It is appreciated that deinstallation instructions could be generated using the same technique as described above for installation instructions. Thus, in embodiments in which the operating system of the clients 110, 115 supports automated application deinstallation, the installation instructions module 330 can also determine instructions to use for uninstalling an application 111 installed using the installation instructions.

The format standardization module 340 optionally ensures that the application data is packaged in a standardized package format. In one embodiment, this involves determining whether the application package is in the predetermined standardized container package format, and if not, encapsulating the application package in the standard container package format. For example, applications of type .app, .pkg, and the like can each be wrapped into a container package file of type .dmg, (or .zip, .gz, .tar, etc.). In other embodiments, package standardization involves determining whether the application package is in a predetermined standardized package format, and if not, converting the package from the current format to the predetermined standardized package format. For example, the .pkg format could be the predetermined standardized package type, so that an .app package would be converted into a .pkg package. Such package standardization allows for greater regularity in handling the resulting packages. For example, the distribution server 120 and any installation scripts need only expect files having the standardized package format.

The upload module 350 provides the packaged application (e.g., in the standardized package format optionally created by the format standardization module 340) and the associated metadata obtained by the metadata extraction module 320 to the distribution server 120, along with the installation instructions (and/or deinstallation instructions) formulated by the installation instructions module 330. In one embodiment, this involves invoking an application programming interface (API) of the server software of the distribution server 120. For example, the distribution server 120 could run a web service, a standard server process, or the like that accepts a set of standard commands (e.g., storeApplication, storeMetadata, storeInstallInstructions). The upload module 350 would then communicate with the distribution server 120 using the standard commands to transfer the application, metadata, and installation instructions to the distribution server and store them within its software catalogue 121.

Figure 4:
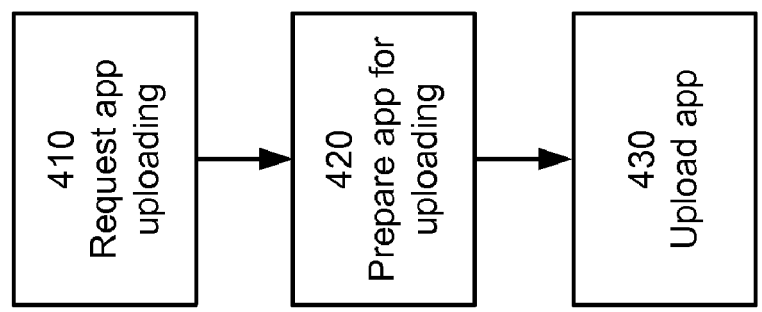
FIG. 4 depicts operations that take place on the source client 110 when providing a client application to the distribution server 120, according to one embodiment.

FIG. 4 depicts operations that take place on the source client 110 when providing a client application—including the application package, and the associated metadata and installation instructions—to the distribution server 120 for registration, according to one embodiment. Initially, there is a request 410 made on the source client 120 for uploading of the application 111. For example, an administrator or other authorized user of the enterprise could specify, e.g. via entry of a command line or use of a graphical tool, that a particular application should be uploaded to the distribution server 120.

As a result of the request 410, the application registration module 112 of the source client 110 prepares 420 the application for uploading to the distribution server 120. This includes extraction of metadata used by the distribution server 120, e.g. data stored by application catalogue 121, such as the name, version, and vendor of the application, as further described above with respect to the metadata extraction module 320 of FIG. 3. The preparation also includes the creation of instructions, such as an installation command line, to be used when installing the application 111 on the target clients 115, as describe above with respect to the installation instructions module 330 of FIG. 3. The preparation may additionally include format standardization, such as encapsulation the package(s) of the application 111 within a .dmg or other container package, as described above with respect to the format standardization module 340 of FIG. 3.

These preparation steps 420 result in metadata about the application 111 and instructions used to install it (and/or uninstall it) on clients, as well as a standardized format for storing the application itself. This resulting data is then uploaded 430 to the distribution server 120 for storage, e.g. within the application catalogue 121, as described further above with respect to the upload module 350 of FIG. 3.

In one embodiment, the operations of FIG. 4 described above are implemented by one or more programs, such as scripts, or applications native to the operating system of the clients 110, 115, that embody the functionality of the various modules depicted in FIG. 3. For example, in an embodiment designed to handle MAC OS X applications, application information is transferred to the distribution server 120 in response to the execution of a program register-package. The register-package program takes an application package as input, extracts metadata from the package, forms a command line to be used for installation on target clients 115, encapsulates the package within a .dmg package file (if needed), and uploads the resulting .dmg file to the distribution server 120 for storage. Then, as specified by the command line associated with the application in the distribution server 120, a dmgutil application could be invoked on a target client 115 and given as arguments the—install switch and the .dmg package file created by register-package. As a result, dmgutil would extract the original package from the .dmg package file and perform the necessary actions to install it based on the package type, such as running the MAC OS X utility installer for applications with package formats .pkg, or .mpkg, or copying an .app package into the /Applications folder.

Thus, in the case of a hypothetical application "myApp" stored in the package myApp.app located on the source client 110, an administrator or other user would run the command register-package myApp.app on the source client, and the necessary application data—including the file myApp.dmg in the standardized .dmg package format—would automatically be transferred to the distribution server 120 as a result. Then, the command dmgutil—install myApp.dmg would be invoked on the target clients 115 on which installation is desired—either manually on each machine, or as part of an automated "push" initiated by the distribution server 120—and would obtain the application information from the distribution server 120 and install it locally on the target client 115. In such an example, the installation program dmgutil is made available on each desired target client 115 prior to local installation of the myApp application. Further, by making both the register-package registration tool and the dmgutil installation tool available on each of the clients 110, 115, an application on any given client can then easily be registered by that client using register-package and installed on the other clients using dmgutil.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A non-transitory computer-readable medium storing a computer program executable by a processor of a first client for registering an application for distribution to a plurality of other clients, the computer program comprising:
    a metadata extraction module for extracting metadata from an application package of a local application designed for a first operating system, the extracting comprising:
        determining whether the application package includes a subpackage; and
        responsive at least in part to the application package including a subpackage:
            mounting the application package on a filesystem,
            extracting the subpackage,
            identifying a predetermined file within the subpackage,
            parsing the predetermined file to identify metadata,
            extracting the metadata, and
            unmounting the application package;
    an installation instructions module for determining instructions for installing the application on a second client having the same operating system as the first operating system;
    a format standardization module for:
        determining whether the application package is of a predetermined standard storage format; and
        responsive to the application package not being of the predetermined standard storage format, creating a modified application package by encapsulating the application package within a package having the predetermined standard storage format; and
    an upload module for providing the modified application package, the extracted metadata, and the determined instructions to a distribution server for storage on the distribution server.

2. The computer-readable medium of claim 1, wherein the extracting of metadata by the metadata extraction module further comprises:
    executing a utility provided by the first operating system on the application package, the utility producing output; and
    extracting metadata from output of the utility.

3. The computer-readable medium of claim 1, wherein the determined instructions comprise a command line referencing at least the modified application package and an installation program for installing the application package.

4. The computer-readable medium of claim 1, wherein the upload module provides the modified application package, the extracted metadata, and the determined instructions to the distribution server at least in part by invoking an upload API of the distribution server.

5. The computer-readable medium of claim 1, wherein the distribution server has a second operating system different from the first operating system.

6. A client computer system for registering an application for distribution to a plurality of other client computer systems, the client computer system comprising a first operating system and a computer processor for executing instructions performing actions comprising:
    extracting metadata from an application package of a local application designed for the first operating system, the extracting comprising:
        determining whether the application package includes a subpackage; and responsive at least in part to the application package including a subpackage:
mounting the application package on a filesystem,
extracting the subpackage,
identifying a predetermined file within the subpackage,
parsing the predetermined file to identify metadata,
extracting the metadata, and
unmounting the application package;
determining instructions for installing the application on a second client having the same operating system as the first operating system;
determining whether the application package is of a predetermined standard storage format;
responsive to the application package not being of the predetermined standard storage format, creating a modified application package by encapsulating the application package within a package having the predetermined standard storage format; and
providing the modified application package, the extracted metadata, and the determined instructions to a distribution server for storage on the distribution server.

7. The client computer system of claim 6, wherein the extracting of metadata further comprises:
executing a utility provided by the first operating system on the application package, the utility producing output; and
extracting metadata from the output of the utility.

8. The client computer system of claim 6, wherein the determined instructions comprise a command line referencing at least the modified application package and an installation program for installing the application package.

9. The client computer system of claim 6, wherein the modified application package, the extracted metadata, and the determined instructions are provided to the distribution server at least in part by invoking an upload API of the distribution server.

10. The client computer system of claim 6, wherein the distribution server has a second operating system different from the first operating system.

11. A computer-implemented method of registering an application for distribution to a plurality of clients, the method comprising:
extracting metadata from an application package of a local application designed for the first operating system, the extracting comprising:
determining whether the application package includes a subpackage; and
responsive at least in part to the application package including a subpackage:
mounting the application package on a filesystem,
extracting the subpackage,
identifying a predetermined file within the subpackage,
parsing the predetermined file to identify metadata,
extracting the metadata, and
unmounting the application package;
determining instructions for installing the application on a second client having the same operating system as the first operating system;
determining whether the application package is of a predetermined standard storage format; and
responsive to the application package not being of the predetermined standard storage format, creating a modified application package by encapsulating the application package within a package having the predetermined standard storage format; and
providing the modified application package, the extracted metadata, and the determined instructions to a distribution server for storage on the distribution server.

12. The computer-implemented method of claim 11, wherein the extracting of metadata further comprises:
executing a utility provided by the first operating system on the application package; and
extracting metadata from output of the utility.

13. The computer-implemented method of claim 11, wherein the distribution server has a second operating system different from the first operating system.

14. The computer-implemented method of claim 11, wherein the determined instructions comprise a command line referencing at least the modified application package and an installation program for installing the application package.

15. The computer-implemented method of claim 11, further comprising providing the modified application package, the extracted metadata, and the determined instructions to the distribution server at least in part by invoking an upload API of the distribution server.

\* \* \* \* \*